(12) United States Patent
Casey et al.

(10) Patent No.: US 6,203,463 B1
(45) Date of Patent: Mar. 20, 2001

(54) TRANSMISSION WITH VARIABLE RATIO UTILIZING THREE PLANETARIES, FIVE MEMBERS, A VARIABLE SPEED PUMP, AND A VARIABLE SPEED MOTOR AND ASSOCIATED METHOD FOR OPERATIVELY CONNECTING COMPONENTS ASSOCIATED THEREWITH

(75) Inventors: Kent A. Casey, Washington; Eric D. Stemler, Peoria, both of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/464,686

(22) Filed: Dec. 16, 1999

(51) Int. Cl.⁷ .................................................. F16H 47/04
(52) U.S. Cl. ............................................................ 475/72
(58) Field of Search ..................................... 475/72, 149

(56) References Cited

U.S. PATENT DOCUMENTS

| | | |
|---|---|---|
| 3,583,256 | 6/1971 | Livezey . |
| 3,596,535 | 8/1971 | Polak . |
| 4,019,404 | 4/1977 | Schauer . |
| 4,823,640 | 4/1989 | Donnelly . |
| 5,080,637 | 1/1992 | Tenberge et al. . |
| 5,248,283 | 9/1993 | Eckhardt et al. . |
| 5,277,670 | 1/1994 | Tenberge . |
| 5,643,121 | 7/1997 | Greenwood et al. . |
| 5,667,452 | 9/1997 | Coutant . |
| 5,730,678 | 3/1998 | Larkin . |
| 5,830,097 | 11/1998 | Larkin . |
| 5,868,640 | 2/1999 | Coutant . |
| 5,888,162 | 3/1999 | Moeller et al. . |
| 5,890,981 | 4/1999 | Coutant et al. . |
| 5,916,050 | 6/1999 | Coutant et al. . |

FOREIGN PATENT DOCUMENTS 5-332418 * 12/1993 (JP) ........................................ 475/72

* cited by examiner

Primary Examiner—Dirk Wright
(74) Attorney, Agent, or Firm—Haverstock, Garrett & Roberts

(57) ABSTRACT

A transmission and an associated method for operatively connecting components associated therewith include a hydrostatic transmission, a mechanical transmission having a planetary gearing mechanism, the mechanical transmission being driven by an engine and the hydrostatic transmission being driven by and interacting with the mechanical transmission to provide infinitely adjustable power flow through the transmission. The planetary gearing mechanism includes three planetary gear sets and five members to connect the transmission to an output.

34 Claims, 5 Drawing Sheets

TRANSMISSION WITH VARIABLE RATIO UTILIZING THREE PLANETARIES, FIVE MEMBERS, A VARIABLE SPEED PUMP, AND A VARIABLE SPEED MOTOR AND ASSOCIATED METHOD FOR OPERATIVELY CONNECTING COMPONENTS ASSOCIATED THEREWITH

TECHNICAL FIELD

This invention relates generally to a transmission and more particularly to a transmission which provides continuously variable ratio operability utilizing a planetary gearing mechanism including three planetary gear sets, five members, a variable speed pump, and a variable speed motor and an associated method for operatively connecting components associated therewith.

BACKGROUND ART

In a machine, such as a wheel loader or a track type tractor, for example, an engine supplies power for propelling the machine in the forward and reverse directions, and for powering machine implements. A transmission is coupled to the engine and transmits power from the engine to the drive train to propel the machine. It is desirable to utilize a continuously variable transmission and manage the transmission ratio to save engine power for the implements and also to provide a continuously variable power flow through the transmission to improve machine productivity. Because machines operate at relatively low speeds and in cyclical work routines, there is a need to control speed precisely and for the speed to be infinitely adjustable throughout the full range of the transmission. One of the problems associated with such an arrangement is to provide a transmission that will operate at high efficiencies over a wide variety of operating conditions. Another problem associated with such an arrangement is to provide a desirable number of output ranges without requiring large hydraulic components and large gear ratios.

The present invention is directed to overcoming one or more of the problems as set forth above.

DISCLOSURE OF THE INVENTION

In one aspect of the present invention, a transmission is disclosed. The transmission includes an input, an output, a motor, a generator or pump drivingly connected to the motor, and a planetary gearing mechanism. The planetary gearing mechanism includes a first, a second and a third planetary gear set, each of the first, second and third planetary gear sets having a sun gear, a carrier with planet gears and a ring gear. A first member of the planetary gearing mechanism is connected to the motor and connectable to the output, a second member of the planetary gearing mechanism is selectably connectable to the output, a third member of the planetary gearing mechanism is connected to the input, a fourth member of the planetary gearing mechanism is selectably connectable to the output, and a fifth member of the planetary gearing mechanism is connected to the pump or generator.

In another aspect of this invention a method for operably connecting components of a transmission that includes an input, an output, a motor, a pump or generator, and a planetary gearing mechanism including a first, a second and a third planetary gear set, the first, second and third planetary gear sets each having a sun gear, a carrier with planet gears and a ring gear is disclosed. The method includes the steps of fluidly connecting the pump to the motor, connecting a first member of the planetary gearing mechanism to the motor and to the output, connecting a second member of the planetary gearing mechanism to the output, connecting a third member of the planetary gearing mechanism to the input, connecting a fourth member of the planetary gearing mechanism to the output, and connecting a fifth member of the planetary gearing mechanism to the pump or generator.

BEST MODE FOR CARRYING OUT THE INVENTION

Figure 1:
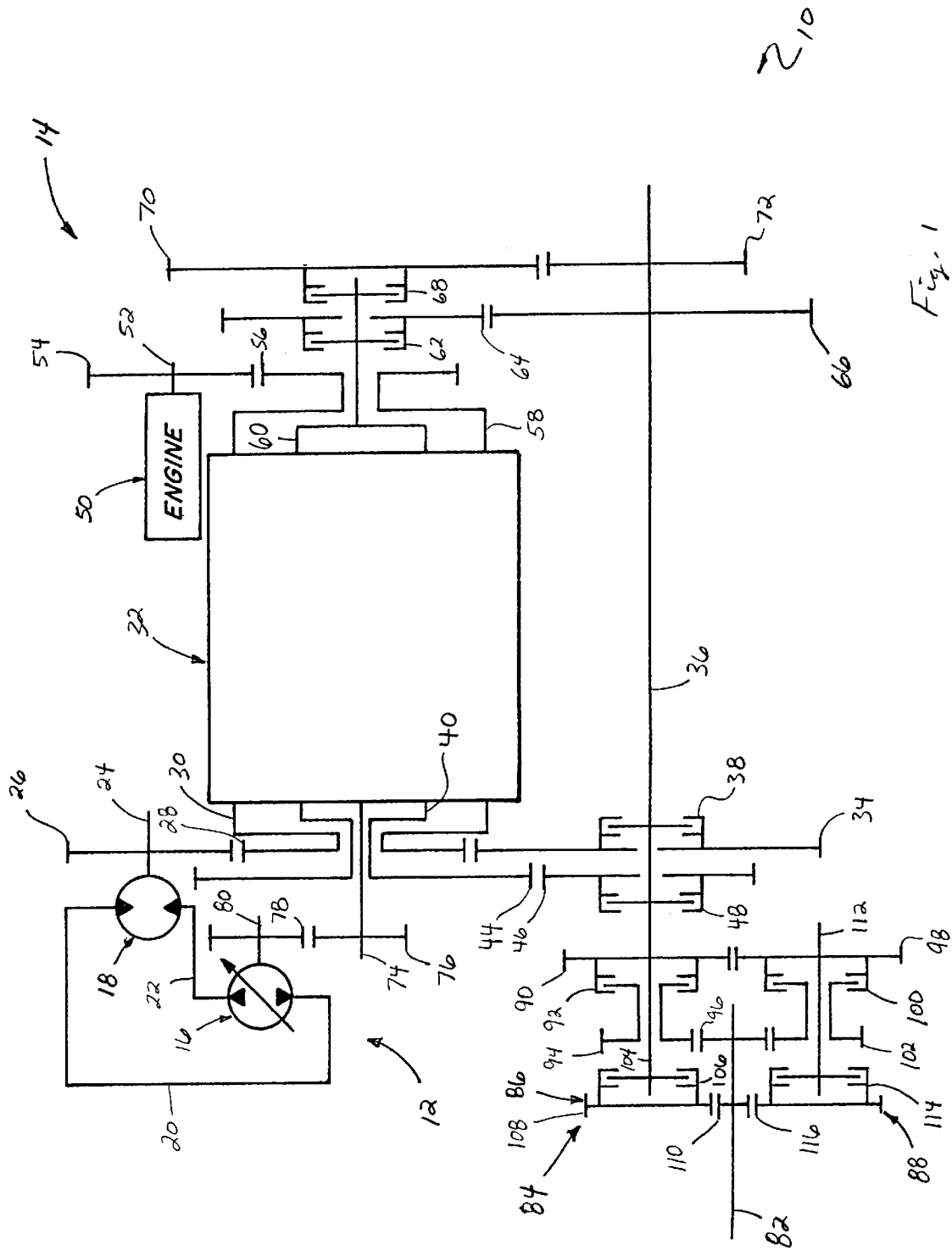
FIG. 1 is a schematic view of a hydromechanical transmission showing the present invention of five members of a planetary gearing mechanism and other aspects of the invention.

Referring to FIG. 1, a transmission 10, preferably hydromechanical, includes a hydrostatic transmission 12 and a mechanical transmission 14. The transmission 10 is used to propel a machine, not shown. The hydrostatic transmission 12 includes a variable displacement pump 16 fluidly connected to a motor 18 through conduits 20, 22. The hydrostatic transmission 12 can use a variable displacement motor or a fixed displacement motor without departing from the scope of the invention. Motor 18 includes an output shaft 24 including a gear 26 enmeshed with a gear 28 on a first member 30 of a planetary gearing mechanism 32 of mechanical transmission 14. Gear 28 is likewise enmeshed with a gear 34 which is selectably connectable to an intermediate output shaft 36 by a first clutch 38. Planetary gearing mechanism 32 includes a second member 40 including a gear 44 which is enmeshed with a gear 46 selectably connectable to intermediate output shaft 36 by a third clutch 48.

An engine 50 has an output shaft 52 including a gear 54 enmeshed with an input gear 56 connected to a third member 58 of planetary gearing mechanism 32. Planetary gearing mechanism 32 includes a fourth member 60 selectably connectable to intermediate output shaft 36 by a second clutch 62 connected to a gear 64 enmeshed with a gear 66 on intermediate output shaft 36, and by a fourth clutch 68 connected to a gear 70 enmeshed with a gear 72 on the intermediate output shaft 36. Planetary gearing mechanism 32 includes a fifth member 74 including a gear 76 enmeshed with a gear 78 on an input shaft 80 of pump 16.

Transmission 10 includes an output shaft 82 selectably connectable to intermediate output shaft 36 by a directional mechanism 84. Directional mechanism 84 includes a forward gear arrangement 86 and a reverse gear arrangement 88, each of the gear arrangements 86, 88 providing two selectable gear ratios for connecting output shaft 82 to intermediate output shaft 36. Forward gear arrangement 86 includes a gear 90 mounted to intermediate output shaft 36 and selectably connectable to output shaft 82 by a first forward output clutch 92 and a gear 94 enmeshed with a gear 96 on output shaft 82. Gear 90 is also enmeshed with a gear 98 of reverse gear arrangement 88 selectably connectable to output shaft 82 by a first reverse output clutch 100 connected to a gear 102 enmeshed with gear 96. Forward gear arrangement 86 includes a transfer shaft 104 connected to intermediate output shaft 36 and selectably connectable to output shaft 82 by a second forward output clutch 106 and a gear 108 enmeshed with a gear 110 on output shaft 82. Similarly, reverse gear arrangement 88 includes a shaft 112 connected to intermediate output shaft 36 by gears 90 and 98, shaft 112 being selectably connectable to output shaft 82 by a second reverse output clutch 114 connected to a gear 116 enmeshed with gear 110.

First forward output clutch 92 is engageable to connect intermediate output shaft 36 to output shaft 82 to allow rotation of output shaft 82 in a forward direction at a first ratio to the rotation of intermediate output shaft 36. Similarly, second forward output clutch 106 is engageable to allow rotation of output shaft 82 in the forward direction at a second ratio with respect to the rotation of intermediate output shaft 36. First reverse output clutch 100 is engageable to allow rotation of output shaft 82 in a reverse direction at a first ratio to the rotation of intermediate output shaft 36, and second reverse output clutch 114 is engageable to allow rotation of output shaft 82 in a reverse direction at a second ratio with respect to intermediate output shaft 86. The members 30, 40, 58, 60 and 74 can each comprise one or more elements of planetary gearing mechanism 32 and any associated gears which are connected together to function as one member.

Reference numerals of components previously described will be repeated in subsequent drawing figures.

Figure 1A:
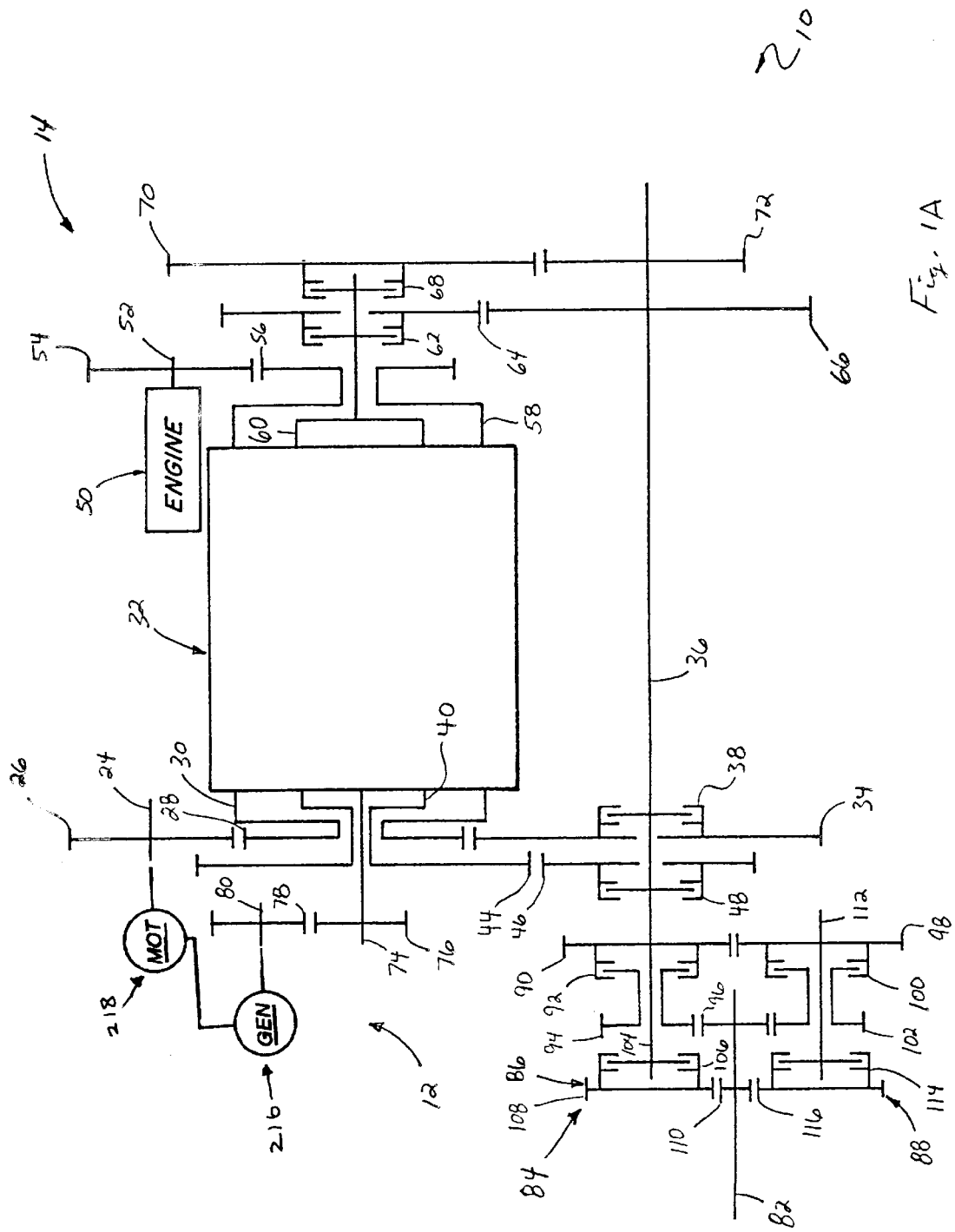
FIG. 1A is a schematic view of an electromechanical transmission, similar to FIG. 1, with a generator and electric motor utilized instead of a pump and hydraulic motor.

Referring to FIG. 1A, the transmission 10 could also be an electromechanical transmission. An electric generator 216 and electric motor 218 could be utilized in place of the variable displacement pump 16 and motor 18, without departing from the scope of the invention.

Figure 2:
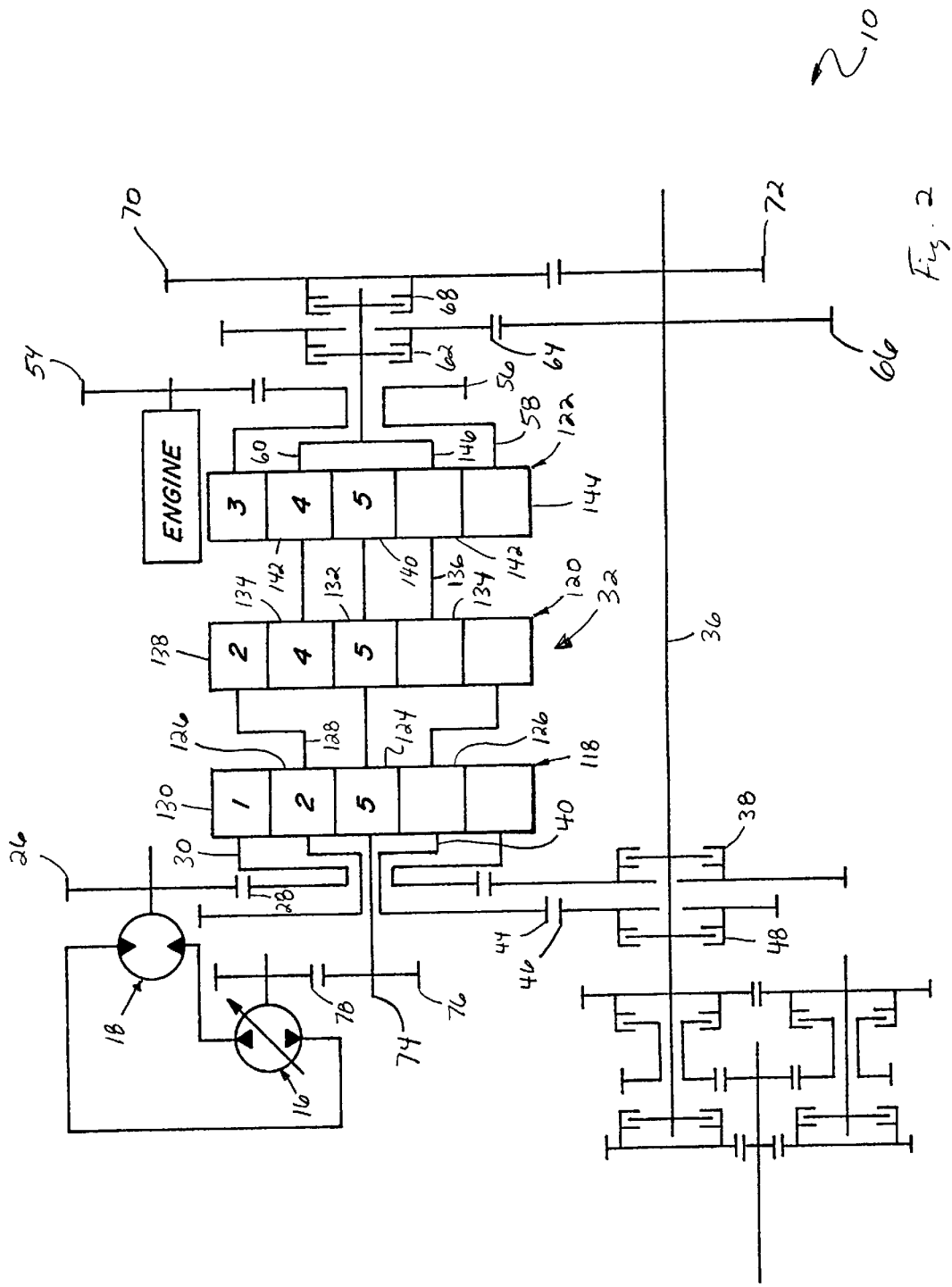
FIG. 2 is a schematic view of a transmission arrangement showing the five members and other aspects of the gearing mechanism.

Referring to FIG. 2, the planetary gearing mechanism 32 of transmission 10 includes a first planetary gear set 118, a second planetary gear set 120 and a third planetary gear set 122. Each planetary gear set 118, 120 and 122 includes elements such as a sun gear, a carrier with planet gears, and a ring gear. First planetary gear set 118 includes a sun gear 124 enmeshed with a plurality of planet gears 126 mounted for rotation on a carrier 128, and a ring gear 130 enmeshed with planet gears 126. First member 30 includes ring gear 130 and is connected to motor 18 by gears 26 and 28, and can be selectably connected to intermediate output shaft 36 by engagement of first clutch 38. Second planetary gear set 120 includes a sun gear 132 enmeshed with a plurality of planet gears 134 mounted for rotation on a carrier 136, and a ring gear 138 enmeshed with planet gears 134. Second member 40 includes planet gears 126 of first planetary gear set 118, carrier 128 and ring gear 138 of second planetary gear set 120, and is connected by enmeshed gears 44 and 46 to third clutch 48 which is selectably engageable for connecting second member 40 to intermediate output shaft 36. Third planetary gear set 122 includes a sun gear 140 enmeshed with a plurality of planet gears 142 which in turn are enmeshed with a ring gear 144. Third member 58 includes ring gear 144 connected to engine 50 by enmeshed gears 54 and 56. Planet gears 142 are mounted for rotation on a carrier 146, and fourth member 60 includes planet gears 134 and 142, and carriers 136 and 146. Fourth member 60 can be selectably connected to intermediate output shaft 36 by engagement of second clutch 62 or fourth clutch 68 which include gears 64 and 70 enmeshed with gears 66 and 72, respectively, on intermediate output shaft 36. Fifth member 74 includes sun gears 124, 132 and 140, and is connected to pump 16 of hydrostatic transmission 12 by gears 76 and 78.

Figure 3:
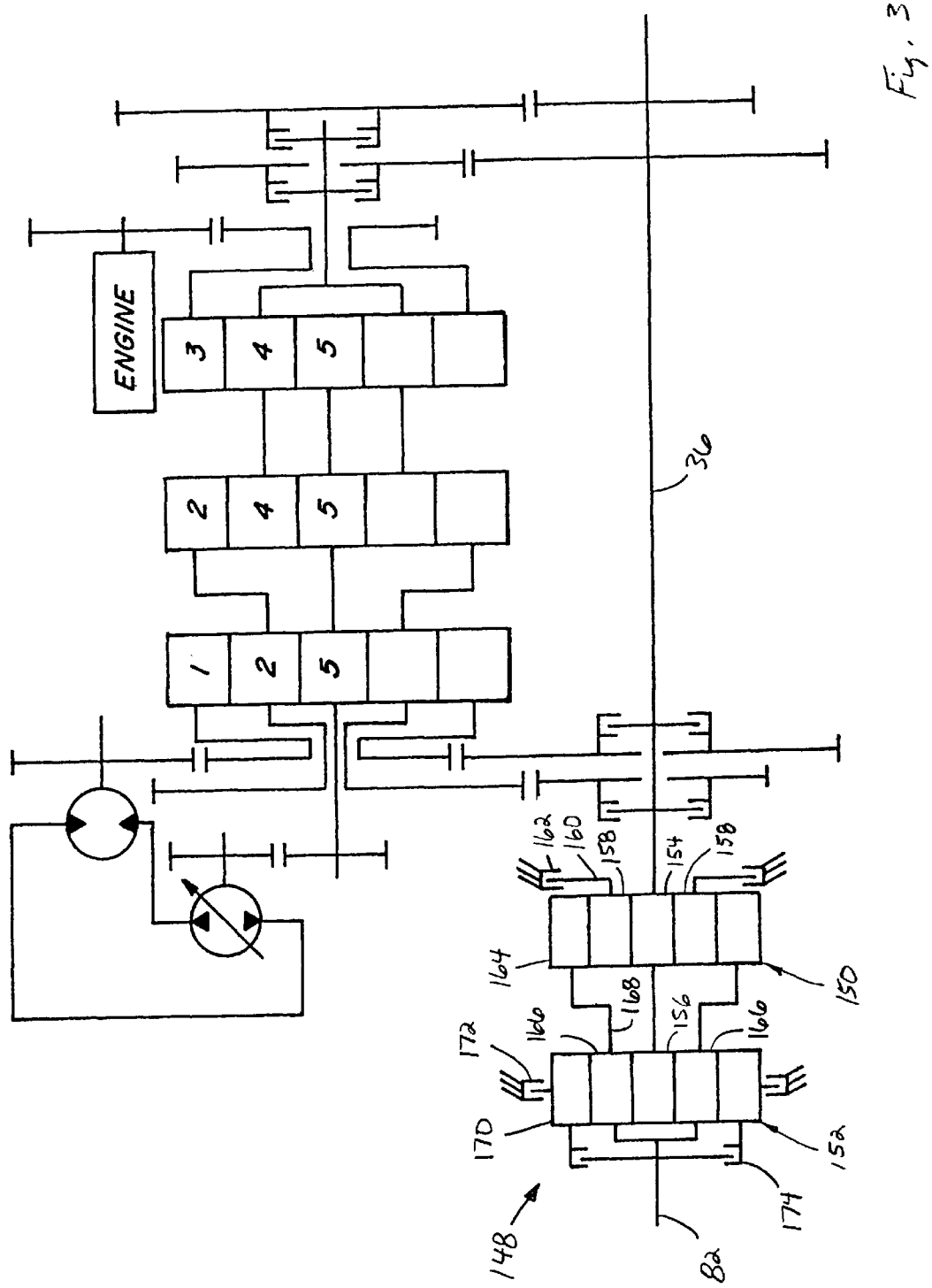
FIG. 3 is a schematic view of an alternative transmission according to the invention.

Referring to FIG. 3, transmission 10 is shown including the same connects as shown in FIG. 2. However, an alternative directional mechanism 148 is shown disposed between intermediate output shaft 36 and output shaft 82. Directional mechanism 148 includes an input planetary gear set 150 and an output planetary gear set 152, gear sets 150, 152 including sun gears 154 and 156, respectively, connected to intermediate output shaft 36. Input planetary gear set 150 includes a plurality of planet gears 158 enmeshed with sun gear 154 and mounted for rotation on a carrier 160 engageable by a grounded clutch 162 for retarding or preventing rotation thereof. Input planetary gear set 150 additionally includes a ring gear 164 enmeshed with planet gears 158. Output planetary gear set 152 includes a plurality of planet gears 166 enmeshed with sun gear 156 and mounted for rotation on a carrier 168 connected to ring gear 164 of input planetary gear set 150. Output planetary gear set 152 includes a ring gear 170 enmeshed with planet gears 166 and engageable by a grounded clutch 172 for retarding or preventing rotation thereof. Carrier 168 is connected to output shaft 82 and is selectably engageable with ring gear 170 by a clutch 174.

Directional mechanism 148 is operable to rotate output shaft 82 in a forward direction when grounded clutch is 162 is disengaged, and in a reverse direction by engagement of grounded clutch 162 to prevent rotation of carrier 160 such that rotation of sun gears 154 and 156 by intermediate output shaft 36 will rotate planet gears 158 to rotate ring gear 164, carrier 168 and the output shaft 82. Output planetary gear set 152 is operable to rotate output shaft 82 within a first ratio range relative to intermediate output shaft 36 by engagement of grounded clutch 172 to allow rotating sun gear 156 to rotate planets 166, carrier 168 and the output shaft 82. To rotate output shaft 82 at a different ratio relative to the rotation of intermediate output shaft 36, clutch 174 is engaged to connect ring gear 170 and carrier 168 such that they are rotated as a unit with output shaft 82 by sun gear 156.

Transmission 10, whether directional mechanism 84 or directional mechanism 148 is used, is operable to driving output shaft 82 infinitely variably through six forward and four reverse ratio ranges or, alternatively, five forward and three reverse ratio ranges with only one functional reverse ratio.

Figure 4:
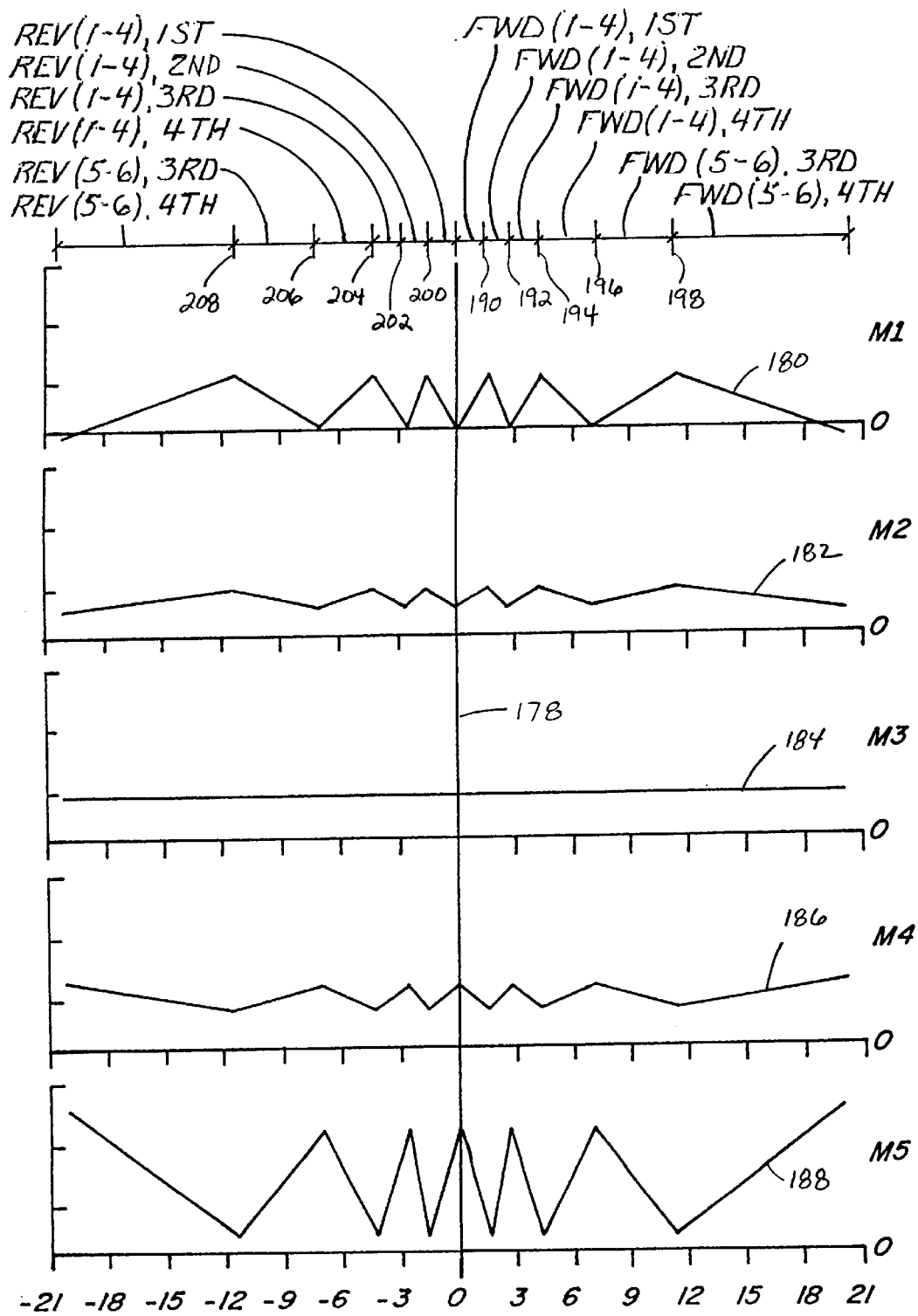
FIG 4 is a schematic representation of a graph showing changes in the five members relative to machine speed.

Referring to FIG. 4, a graph 176 discloses the changes in the speeds of members 30, 40, 58, 60 and 74 and associated components of transmission 10 as machine speed increases from a stop until maximum speed is achieved in both forward and reverse directions. The graph 176 shows the speed changes of the various members with an example of a general connection as shown in FIG. 1. Line 178 represents zero machine speed. Line 180 represents the speed of first member 30, line 182 represents the speed of second member 40, line 184 represents the speed of third member 58, line 186 represents the speed of fourth member 60, and line 188 represents the speed of fifth member 74. At the top of graph 176, line 190 represents disengagement of first clutch 38 and engagement of second clutch 62, with clutch 92 of the directional mechanism 84 engaged for movement in the forward direction. Line 192 represents disengagement of second clutch 62 and engagement of third clutch 48 with clutch 92 of the directional mechanism 84 engaged. Line 194 represents disengagement of third clutch 48 and engagement of fourth clutch 68 with clutch 92 of the directional mechanism 84 engaged. Line 196 represents disengagement of fourth clutch 68 and engagement of third clutch 48, and disengagement of clutch 92 of the directional mechanism 84 and engagement of clutch 106. Line 198 represents disengagement of third clutch 48 and engagement of fourth clutch 68 with clutch 106 of the directional mechanism 84 engaged.

Lines 200, 202, 204, 206 and 208 represent disengagement of the first clutch 38 and engagement of second clutch 62, disengagement of second clutch 62 and engagement of third clutch 48, and disengagement of third clutch 48 and engagement of fourth clutch 68, all with clutch 100 of directional mechanism 84 engaged, to rotate output shaft 82 in a reverse direction. Line 206 represents a shift change wherein fourth clutch 68 is disengaged and third clutch 48 is engaged with clutch 114 of directional mechanism 84 engaged to rotate output shaft 82 in the reverse direction. Line 208 represents the shift change when third clutch 48 is disengaged and fourth clutch 68 is engaged with clutch 114 of directional mechanism 84 engaged to rotate output shaft 82 in the reverse direction.

Industrial Applicability

In the use of the transmission 10 of the present invention, the hydrostatic transmission 12 and the mechanical transmission 14 interact to provide a continuously variable and efficient output which enables the engine 50 to operate at its best efficiency. Additionally, transmission 10 provides six forward and six reverse speed ranges without requiring large hydraulic components and without introducing large ratio differences between the planetary gearing mechanism and the output aspects of the transmission.

With reference to FIGS. 1, 2 and 4, in operation of the transmission 10 of the subject invention, with the engine 50 operating at a predetermined speed and clutches 38, 62, 48 and 68 disengaged, the machine speed is zero. If the operator elects to move the machine forward, for example, from zero to approximately one to two miles per hour, first clutch 38 and first forward output clutch 92 of directional mechanism 84 is engaged to achieve a first gear ratio. When a higher forward speed is desired, clutch 38 is disengaged and second clutch 62 engaged to achieve a second ratio which allows a maximum machine speed of almost 3 miles an hour. When a higher forward machine speed is desired, second clutch 62 is disengaged and third clutch 48 engaged. When a still greater forward machine speed is desired, third clutch 48 is disengaged and fourth clutch 68 is engaged to allow achieving a maximum forward machine speed of greater than 6 miles an hour. If a greater forward machine speed is desired, for instance, for road travel, fourth clutch 68 can be disengaged, first forward output clutch of directional mechanism 84 disengaged, and third clutch 48 and second forward output clutch 106 of directional mechanism 84 engaged. For an even greater forward machine speed, third clutch 48 can be disengaged and fourth clutch 68 engaged to enable achieving a forward machine speed of almost 21 miles per hour. Similar machine speeds in the reverse direction can likewise be achieved by use of clutches 38, 62, 48 and 68 in conjunction with use of clutches 100 and 114 of directional mechanism 84.

From the foregoing discussion, it should be apparent that first member 30 is connected to the output in the first speed range. The second member 40 is connected to the output in the third and fifth speed range, respectively. Third member 58 is connected to engine 50 in all speed ranges. Fourth member 60 is connected to the output in the second, fourth and sixth speed ranges. Fifth member 74 is connected to the hydraulic pump in all speed ranges.

In view of the foregoing, it is readily apparent that the transmission of the present invention having five members and three planetary gear sets will provide a continuously variable transmission. A significant advantage of the invention is that it allows the hyrdromechanical transmission 10 the ability to use and select multiple output and reductions that allow the transmission 10 to cover a much broader speed range without larger variable speed components. The transmission 10 functions just like a high/low box at the output of a typical mechanical transmission, however, a unique aspect is the selection of ratios that allow the shift from low to high to happen such that the engine speed does not have to change and the only inertia change in the system is for the intermediate output shaft 36 and components geared to rotate with the intermediate output shaft 36. This non-synchronous shift would ideally be phased to synchronize the minor inertia change against the input, and then, synchronously engaging the output, preventing machine jerk. All other shifts remain fully synchronous.

The concept applies equally to make a three speed range transmission into a five speed range transmission as to making the four speed range transmission into a six speed range transmission as previously described above. For instance, a three speed range transmission can be extended to five speed range transmission. Also, a two speed range transmission could be converted into a four speed range transmission, however, the resulting third range would be fairly narrow since this four speed range transmission would not be able to fully utilize the first range because it would start at zero speed. A potential extension of this concept would be to have more than two output speed ranges.

Other aspects, objects and advantages of this invention can be obtained from a study of the drawings, the disclosure and the appended claims.

What is claimed is:

1. A transmission comprising:

an input;

an output;

a motor;

a pump fluidly connected to the motor;

a planetary gearing mechanism including a first, a second and a third planetary gear set, the first, second and third planetary gear sets each having a sun gear, a carrier with planet gears and a ring gear;

a first member of the planetary gearing mechanism connected to the motor and connectable to the output;

a second member of the planetary gearing mechanism connectable to the output;

a third member of the planetary gearing mechanism connected to the input;

a fourth member of the planetary gearing mechanism connectable to the output; and a fifth member of the planetary gearing mechanism connected to the pump.

2. The transmission of claim 1, wherein the output comprises a directional mechanism having at least two operating ratios.

3. The transmission of claim 1, wherein the input is connected to an engine.

4. The transmission of claim 1, wherein the first member includes the ring gear of the first planetary gear set, the second member includes the planet gears and carrier of the first planetary gear set and the ring gear of the second planetary gear set, the third member includes the ring gear of the third planetary gear set, the fourth member includes the planet gears of the second and third planetary gear sets, and the fifth member includes the sun gears of the planetary gear sets.

5. The transmission of claim 1, further including a clutch for connecting the first member to the output.

6. The transmission of claim 1, further including a clutch for connecting the fourth member to the output.

7. The transmission of claim 1, further including a clutch for connecting the second member to the output.

8. The transmission of claim 6, further including another clutch for connecting the fourth member to the output.

9. The transmission of claim 1, wherein the output comprises an intermediate output shaft, an output shaft and a directional mechanism disposed therebetween for selectably connecting the intermediate output shaft to the output shaft for rotating the output shaft in a forward direction and an opposite reverse direction, respectively.

10. The transmission of claim 9, wherein the directional mechanism includes at least two selectable gear arrangements for rotating the output shaft relative to the intermediate output shaft at different ratios one to the other.

11. A transmission comprising:
   an input;
   an output;
   a motor;
   a generator connected to the motor;
   a planetary gearing mechanism including a first, a second and a third planetary gear set, the first, second and third planetary gear sets each having a sun gear, a carrier with planet gears and a ring gear;
   a first member of the planetary gearing mechanism connected to the motor and connectable to the output;
   a second member of the planetary gearing mechanism connectable to the output;
   a third member of the planetary gearing mechanism connected to the input;
   a fourth member of the planetary gearing mechanism connectable to the output; and
   a fifth member of the planetary gearing mechanism connected to the generator.

12. The transmission of claim 11, wherein the output comprises a directional mechanism having at least two operating ratios.

13. The transmission of claim 11, wherein the input is connected to an engine.

14. The transmission of claim 11, wherein the first member includes the ring gear of the first planetary gear set, the second member includes the planet gears and carrier of the first planetary gear set and the ring gear of the second planetary gear set, the third member includes the ring gear of the third planetary gear set, the fourth member includes the planet gears of the second and third planetary gear sets, and the fifth member includes the sun gears of the planetary gear sets.

15. The transmission of claim 11, further including a clutch for connecting the first member to the output.

16. The transmission of claim 11, further including a clutch for connecting the fourth member to the output.

17. The transmission of claim 11, further including a clutch for connecting the second member to the output.

18. The transmission of claim 16, further including another clutch for connecting the fourth member to the output.

19. The transmission of claim 11, wherein the output comprises an intermediate output shaft, an output shaft and a directional mechanism disposed therebetween for selectably connecting the intermediate output shaft to the output shaft for rotating the output shaft in a forward direction and an opposite reverse direction, respectively.

20. The transmission of claim 19, wherein the directional mechanism includes at least two selectable gear arrangements for rotating the output shaft relative to the intermediate output shaft at different ratios one to the other.

21. A method for operably connecting components of a transmission that includes an input, an output, a motor, a pump, and a planetary gearing mechanism including a first, a second and a third planetary gear set, the first, second and third planetary gear sets each having a sun gear, a carrier with planet gears and a ring gear, the method comprising the steps of:
   fluidly connecting the pump to the motor;
   connecting a first member of the planetary gearing mechanism to the motor and to the output;
   connecting a second member of the planetary gearing mechanism to the output;
   connecting a third member of the planetary gearing mechanism to the input;
   connecting a fourth member of the planetary gearing mechanism to the output; and
   connecting a fifth member of the planetary gearing mechanism to the pump.

22. The method of claim 21, wherein the output comprises a directional mechanism having at least two operating ratios.

23. The method of claim 21, further including the step of connecting the input to an engine.

24. The method of claim 21, wherein the first member includes the ring gear of the first planetary gear set, the second member includes the planet gears and carrier of the first planetary gear set and the ring gear of the second planetary gear set, the third member includes the ring gear of the third planetary gear set, the fourth member includes the planet gears of the second and third planetary gear sets, and the fifth member includes the sun gears of the planetary gear sets.

25. The method of claim 21, further including the step of connecting the first member to the output utilizing a clutch.

26. The method of claim 21, further including the step of connecting the fourth member to the output utilizing a clutch.

27. The method of claim 21, further including the step of connecting the second member to the output utilizing a clutch.

28. The method of claim 26, further including comprising the step of connecting the fourth member to the output utilizing another clutch.

29. The method of claim 21, wherein the output comprises an intermediate output shaft, an output shaft and a directional mechanism disposed therebetween, the method further comprising the step of selectably connecting the intermediate output shaft to the output shaft for rotating the output shaft in a forward direction and an opposite reverse direction, respectively.

30. The method of claim 19, wherein the directional mechanism includes at least two selectable gear arrangements, the method further comprising the step of rotating the output shaft relative to the intermediate output shaft at different ratios one to the other.

31. A method for operably connecting components of a transmission that includes an input, an output, a motor, a generator, and a planetary gearing mechanism including a first, a second and a third planetary gear set, the first, second and third planetary gear sets each having a sun gear, a carrier with planet gears and a ring gear, the method comprising the steps of:

connecting the generator to the motor;

connecting a first member of the planetary gearing mechanism to the motor and to the output;

connecting a second member of the planetary gearing mechanism to the output;

connecting a third member of the planetary gearing mechanism to the input;

connecting a fourth member of the planetary gearing mechanism to the output; and connecting a fifth member of the planetary gearing mechanism to the generator.

32. The method of claim 21, wherein the output comprises a directional mechanism having at least two operating ratios.

33. The method of claim 21, further including the step of connecting the input to an engine.

34. The method of claim 21, wherein the first member includes the ring gear of the first planetary gear set, the second member includes the planet gears and carrier of the first planetary gear set and the ring gear of the second planetary gear set, the third member includes the ring gear of the third planetary gear set, the fourth member includes the planet gears of the second and third planetary gear sets, and the fifth member includes the sun gears of the planetary gear sets.

\* \* \* \* \*